United States Patent [19]

Stark

[11] Patent Number: 5,226,240
[45] Date of Patent: Jul. 13, 1993

[54] MEASUREMENT GAUGE FOR ORIFICE METER

[75] Inventor: Stephen T. Stark, Tulsa, Okla.

[73] Assignee: Williams Natural Gas Company, Tulsa, Okla.

[21] Appl. No.: 912,827

[22] Filed: Jul. 13, 1992

[51] Int. Cl.[5] .......................... G01B 3/46; G01B 3/26; G01B 3/42
[52] U.S. Cl. ...................................... 33/542; 33/544.3
[58] Field of Search ...................... 33/542, 543.1, 544, 33/544.1, 544.2, 544.3, 542.1

[56] References Cited

U.S. PATENT DOCUMENTS

| | | | |
|---|---|---|---|
| 1,112,699 | 10/1914 | Houston | 33/544.2 |
| 3,274,692 | 9/1966 | Morrison | 33/542 |
| 4,200,987 | 5/1980 | Schmitt | 33/542 |
| 4,307,514 | 12/1981 | Ange et al. | 33/543.1 |
| 4,385,446 | 5/1983 | Roch et al. | 33/542 |
| 4,476,634 | 10/1984 | Yamamoto et al. | 33/542 |
| 4,483,078 | 11/1984 | Stevens | 33/542 |
| 4,712,585 | 12/1987 | Evans | 138/44 |
| 4,750,370 | 6/1988 | Ossyra | 73/861.61 |

OTHER PUBLICATIONS

*Manual of Petroleum Measurement Standards*, Chapter 14; Natural Gas Fluids Measurement, Section 3-Orifice Metering of Natural Gas and Other Related Hydrocarbon Fluids, American Petroleum Institute, API Standard 2530, 2nd Edition; Sep. 1985.

*The Gas Engineer's Handbook*, Editors-in-Chief; C. George Segeler, N.Y.; 1965, The Industrial Press (5.7A517GA).

*Primary Examiner*—William A. Cuchlinski, Jr.
*Assistant Examiner*—C. W. Fulton
*Attorney, Agent, or Firm*—Head & Johnson

[57] ABSTRACT

A measurement gauging device for an orifice meter having a restricting orifice plate, and pressure tap holes through the meter tube flanges, or through the orifice plate holding device (commonly called an orifice fitting), each side of the orifice plate to measure differential pressure through the meter tube. The measurement gauge includes a shank receivable through and rotatable in each of the pressure tap holes. An arm is moveable about an axis passing through and perpendicular to the shank. A mechanism is provided to move the arm between an extended position perpendicular to the shank and a retracted position substantially parallel to the shank wherein rotation of the shank while the arm is perpendicular will rotate the arm radially within the meter tube.

12 Claims, 2 Drawing Sheets

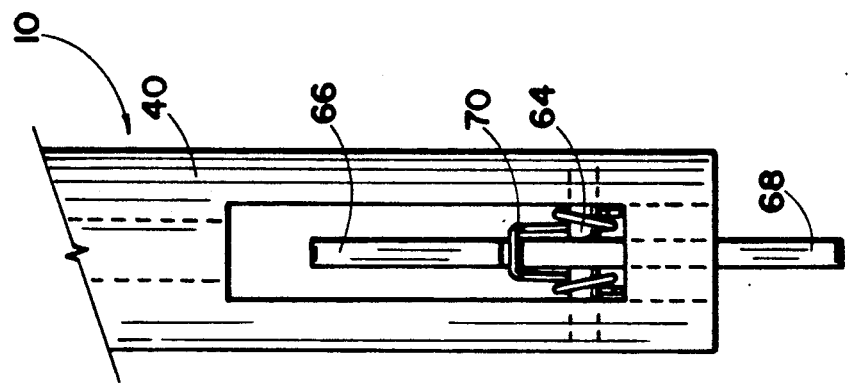
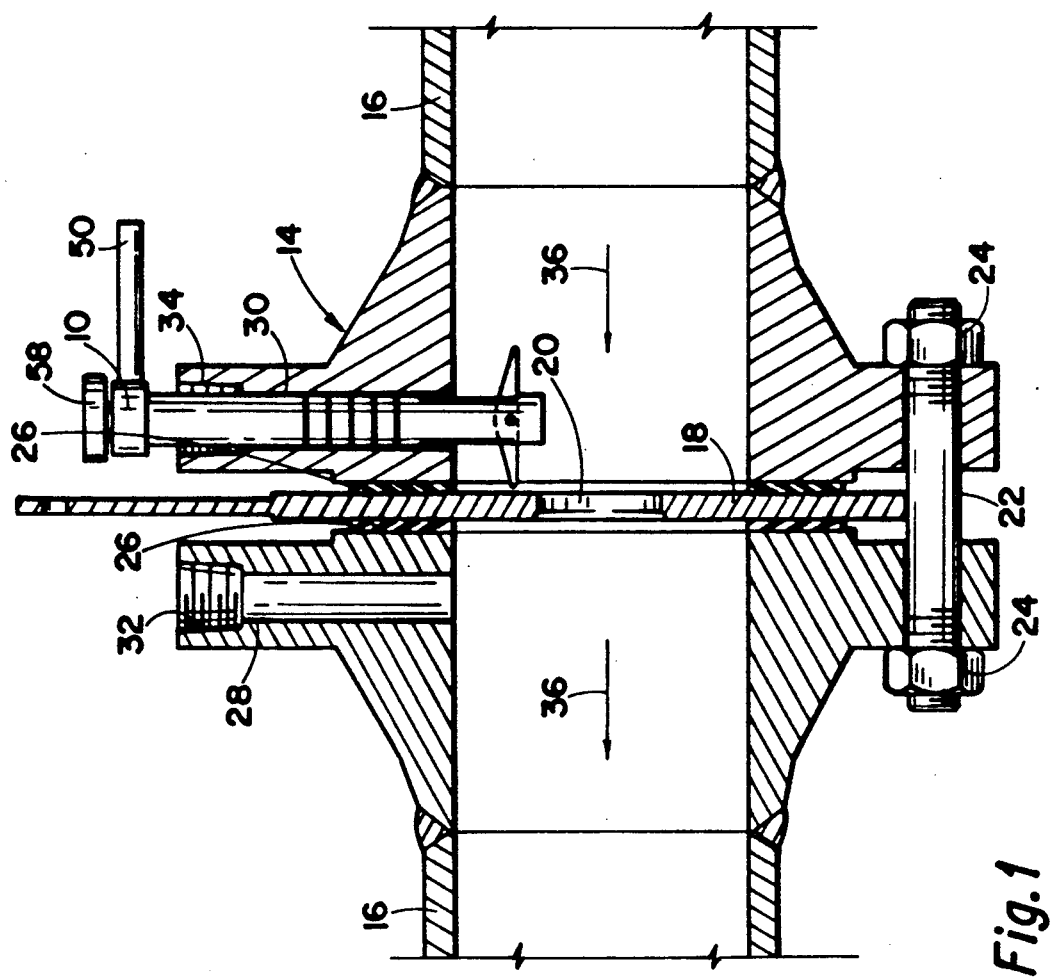

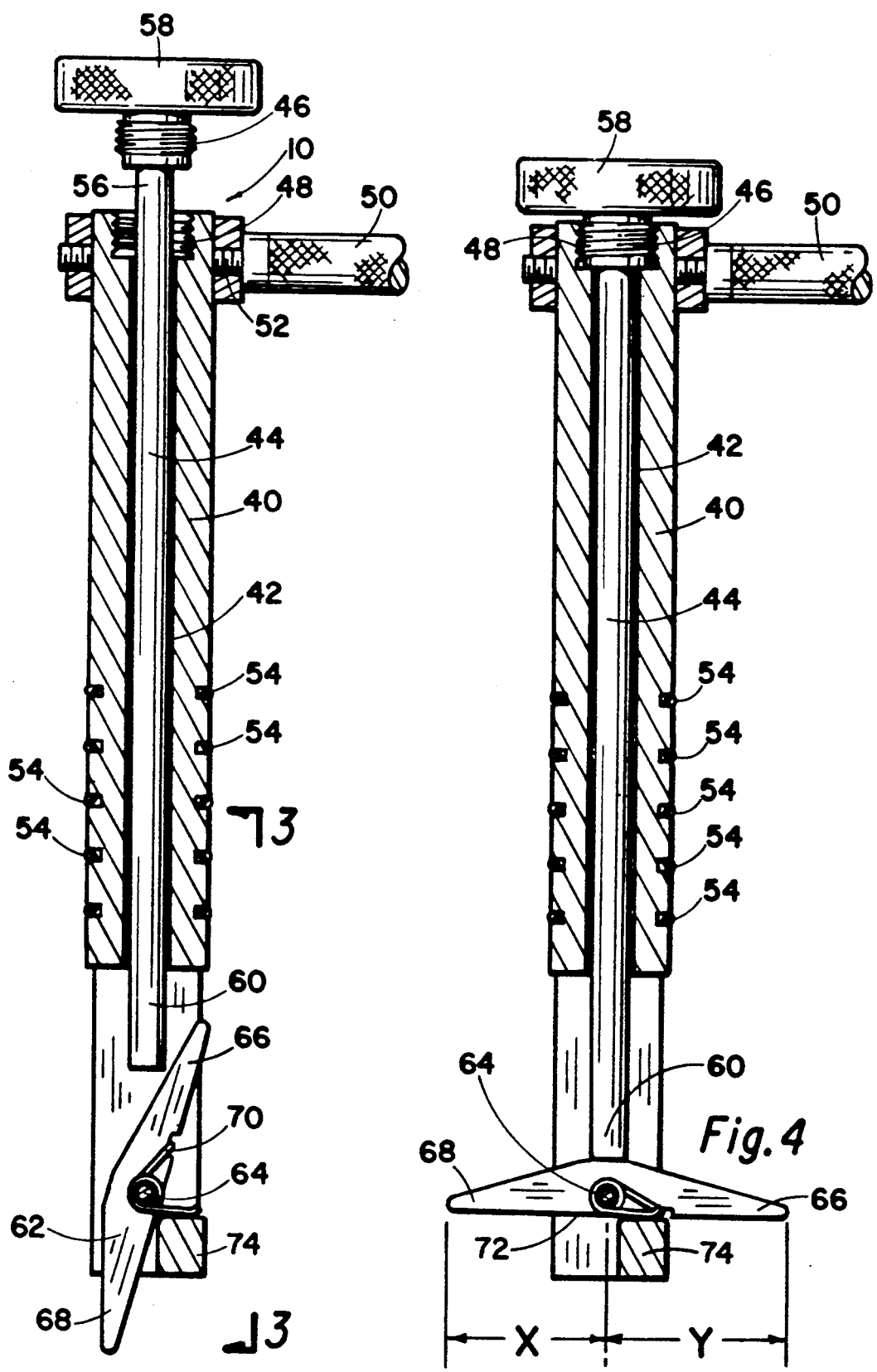

MEASUREMENT GAUGE FOR ORIFICE METER

BACKGROUND OF THE INVENTION

1. Field of the Invention

The present invention relates to a measurement gauge for an orifice meter which is used in the measurement of fluid flow. In particular, the present invention is directed to a measurement gauge to determine whether an orifice meter is in compliance with certain minimum and maximum tolerances wherein the measurement may be taken without disassembly of the meter tube.

2. Background of the Invention

It is well known that a fluid, such as natural gas, flowing through a pipe, or other closed conduit, can be measured by placing a restriction, such as an orifice plate, inside the pipe or closed conduit to cause a reduction in pressure (pressure drop) as the fluid flows through the opening in the orifice plate. This pressure drop is known as the differential pressure. There is a relationship between the amount of this pressure drop and the rate of fluid flow through an opening in the orifice plate and, therefore, the meter tube as well as the pipe or closed conduit.

Bernoulli first theorized that energy cannot be destroyed but only changed from one form to another. In the orifice meter, potential energy is converted into kinetic energy. Hence, the equation:

$$v = \sqrt{2GH}$$

where the velocity of fluid (V) passing through the orifice is equal to the square root of 2 times the product of gravity (G) multiplied by the head (H).

In a typical orifice meter, an orifice plate having a restricted circular orifice is inserted perpendicular to the flow through the meter tube. A first pressure tap hole is placed immediately upstream of the upstream face of the orifice plate. A second pressure tap hole is placed immediately downstream of the downstream face of the orifice plate. The pressure taps are connected to a recording device (or electronic differential pressure transmitter or transducer) by use of tubing or small diameter pipe so that the differential pressure may be measured, sensed or recorded. This differential pressure is utilized to determine the rate of flow through the opening in the orifice plate and, therefore, the meter tube as well as the pipe or closed conduit.

Allowable variations in the location of the pressure taps are specified by API and ANSI Standards (see ANSI/API Standard 2530, published 1985, also called AGA Report Number 3, and API Manual of Petroleum Measurement Standards, Chapter 14.3, Part 2, February 1991). The location of the taps is critical not only to meet the standards but to accurately measure the flow of fluid. Accurate measurement of the flow is important for a number of reasons. Initially, API, AGA and ANSI standards set minimum and maximum tolerances allowed so that orifice meters attempting to meet these standards must be in compliance. Additionally, since pipeline companies increasingly transport gas for other entities, the payments will be directly dependent upon the flow of gas so accurate measurement is important. Finally, taxes and royalties are computed from the flow of gas. In summary, the measurement of fluid flow through a pipeline applies to the production, processing, transportation and distribution of fluids.

Accordingly, it is a principal object and purpose of the present invention to provide a measurement gauge device for an orifice meter.

It is a further object and purpose of the present invention to provide a measurement gauge device which may be used within a pipeline without completely disassembling the orifice meter or the pipeline.

SUMMARY OF THE INVENTION

The present invention provides a measurement gauge device which may be used with an orifice meter. The typical orifice meter includes an orifice plate having a restricted circular orifice therethrough. The plate is retained in a position perpendicular to the axis of the meter tube by fasteners such as bolts and nuts, or by use of an orifice fitting. Gaskets, or other sealing devices, assure a proper seal between the orifice plate and the upstream tube and downstream sections of the meter tube.

The orifice meter includes a pair of pressure tap holes, one pressure tap hole being downstream of the orifice plate and one pressure tap hole being upstream of the orifice plate. Each of the pressure tap holes is substantially tubular and has an axis which is perpendicular to the axis of the meter tube and passes therethrough. The tap holes would be connected to tubing, pipe or hoses which would lead to a flow recorder, differential pressure transducer or transmitter to determine the differential pressure.

The center of the upstream pressure tap hole should be located one inch from the upstream face of the orifice plate. Likewise, the center of the downstream pressure tap hole is to be located one inch from the downstream face of the orifice plate.

There are minimum plus or minus tolerances which are specified by standards. The measurement gauge device itself includes a shank which is substantially cylindrical and has a diameter slightly smaller than the diameter of each pressure tap hole. The shank will fit snugly within the pressure tap hole but may be rotated within the pressure tap hole.

The shank has an axial bore through which passes a shaft. The shaft is both rotatable and movable axially within the bore. The shaft includes a threaded portion which may engage a threaded recess in the bore. The shank also includes a handle extending radially therefrom. The shank may also include a series of external O-rings, or other devices, that fit in recesses in the circumference of the shank to help facilitate centering and a snug fit in the pressure tap hole.

The shaft terminates at one end in a knob which may be held in the hand of an operator and rotated. The opposite end of the shaft has an end which is so fitted to engage and hold in place an arm which is also included.

The arm, which rotates about a pin having an axis which passes through the axis of the shank, is perpendicular therewith. The arm includes a first end and a second end which will move radially about the pin. Accordingly, the arm will move between a position that is substantially perpendicular to the shank and a position which is substantially parallel to the shank. When the end of the shaft is moved axially, it will engage the arm. A spring urges the arm toward a position which is generally parallel to the shank. In order to move the shaft axially, the threaded portion of the shaft is engaged with the threaded recess bore. The knob is rotated to cause the shaft to move toward the arm. When the end of the shaft engages the arm, the ends of the arm will move radially. Further rotation of the knob causes the arm to move toward a position perpendicular to the shaft. The arm will continue to move until the base of the arm rests against a stop extending from the shank.

The distance between the pin and the end of each arm is different. The distance from the pin to the end of one arm is slightly less than or shorter than the minimum tolerable variation between the center of the tap hole and the closest face of the orifice plate. The distance between the pin and the end of the other arm will be slightly longer than the maximum tolerable distance between the center of the pressure tap hole and the closest face of the orifice plate.

When the device is inserted through the pressure tap hole, and the knob rotated, the arm will be perpendicular to the shank and resting against the stop.

Thereafter, the device itself will be rotated by use of the handle. If positioning of the pressure tap hole is proper with respect to the orifice plate, the shorter arm should pass the orifice plate without hitting or otherwise striking the orifice plate. Conversely, the longer arm should strike against the orifice plate and will not pass. The operator can thereby determine that the pressure tap hole location is proper and meets the tolerances of all standards.

BRIEF DESCRIPTION OF THE DRAWINGS

FIG. 1 shows a sectional view of a typical orifice meter into which is inserted the measurement gauge device constructed in accordance with the present invention;

FIG. 2 is a front view of a measurement gauge device as shown in FIG. 1 which has been sectioned for clarity and shows the arm in the retracted position;

FIG. 3 shows a sectional view taken along section line 3—3 of FIG. 2; and

FIG. 4 shows a front view of the measurement gauge device as shown in FIG. 1 with the arm in the extended position.

DETAILED DESCRIPTION OF THE PREFERRED EMBODIMENT

Referring to the drawings in detail, FIG. 1 illustrates a measurement gauge device 10 constructed in accordance with the present invention which is shown inserted within typical orifice meter flanges 14 that might be interposed in a meter tube 16 used for the measurement of fluid flow. The orifice meter 14 includes an orifice plate 18 which is substantially perpendicular to the axis of the meter tube 16. The orifice plate 18 has a restricted circular concentric orifice 20 therethrough. The orifice meter 14 and the orifice plate 18 may be retained in position by a bolt 22 or bolts and accompanying nuts 24. Gaskets 26 assure a seal between the orifice plate and the upstream and downstream sections of the meter tube.

The orifice meter 14 includes a pair of pressure tap holes 28 and 30, one pressure tap hole being downstream of the orifice plate 18 and one pressure tap hole being upstream from the orifice plate. Each of the pressure tap holes are substantially tubular and has an axis which is perpendicular to and passes through the axis of the meter tube. Each pressure tap hole terminates in a threaded fitting 32 and 34, respectively.

The threaded fittings 32 and 34 would each have hoses or tubes which would lead to a recorder, such as a chart recorder (not shown) or a pressure transducer (not shown) in order to determine the differential pressure between the upstream and the downstream sides of the orifice plate.

FIG. 1 illustrates the present invention utilized with a flange tapped orifice meter.

In the present embodiment, arrows 36 indicate the flow of fluid through the meter tube. Accordingly, pressure tap hole 30 is upstream of the orifice plate while pressure tap hole 28 is downstream from the orifice plate. In meter tubes using flange taps such as shown in FIG. 1, the center of the upstream pressure tap hole or the axis is to be located one inch from the upstream face of the orifice plate. Likewise, the center of the downstream pressure tap hole 28 is to be one inch from the downstream face of the orifice plate.

It will be observed that in the type of orifice plate holding device shown, the gaskets 26 will be pertinent in determining the distance. It is advantageous to tighten the bolts on the gaskets before the measurement is taken.

There are minimum plus or minus tolerances which are specified by standard.

FIG. 2 illustrates a sectional view of the measurement gauge device 10. The device itself includes a shank 40 which in the present embodiment is substantially cylindrical and has a diameter slightly smaller than the diameter of each pressure tap hole. The shank will thus fit snugly within the pressure tap hole. At the same time, the shank may be rotated with respect to the pressure tap hole. It will be observed that the axis of the shank is identical to the axis of the tubular pressure tap hole. The axis of the shank is also parallel to the closest face of the orifice plate 18, which is of uniform thickness.

The shank 40 has an axial bore 42 through which passes a shaft 44. The shaft is both rotatable and movable axially within the bore 42. The shaft 44 includes a threaded portion 46 which may engage threaded recess 48 in the bore. The threaded portion 46 is shown apart from the threaded recess 48 in FIG. 2. The shank 40 also includes a handle 50 extending radially therefrom. The handle may be affixed to the shank by any known means such as by a screw or bolt 52. The shank may also include a series of external O-rings 54 that fit in recesses in the circumference of the shank. The O-rings assist in centering the device within the pressure tap hole. The O-rings are removable and may be replaced periodically.

The shaft 44 terminates at one end 56 in a knob 58 which may be held in the hand of an operator (not shown) and rotated. The opposite end 60 of the shaft has a flat end.

The device 10 also includes an arm 62 which rotates about a pin 64 having an axis which passes through the axis of the shank and is perpendicular therewith. The arm includes a first end 66 and a second end 68. The ends of the arm may be heat treated and hardened so as to resist wear and may also be changeable in length. The ends 66 and 68 of the arm will move radially about the pin. Accordingly, the arm will move between an extended position perpendicular to the shank to a position which is in angular relation therewith. In the fully retracted position, the arm approaches a position parallel with and aligned with the shank.

FIG. 2, the arm is substantially parallel and aligned with the shank.

The arms 66 and 68 extend from opposite sides of the pin. The end 60 of the shaft 44 will engage the arm when it is moved axially. In the position shown in FIG. 2, the arm is in the position at rest. A spring 70 urges the arm into the position illustrated in FIG. 2 to allow removal of the gauge.

FIG. 3 illustrates a section view taken line 3—3 of FIG. 2. The spring 70 may be observed wrapped around the pin engaged with the arm.

FIG. 4 is a sectional view of the measurement gauge device with the shaft 44 moved axially from the position shown in FIG. 2. In order to move the shaft axially, the threaded portion 46 is engaged with the threaded recess 48. Thereafter, the knob 58 is rotated clockwise. This will cause the shaft 44 to move in the direction of the end 60. Accordingly, the end 60 of the shaft will engage with the arm 62 so as to begin to move the ends 66 and 68 of the arm radially.

Further rotation of the knob 58 will cause the arm to move toward a position perpendicular to the shaft. The arm will continue to move until the base 72 of the arm rests against a stop 74 on the shank 40.

The distance between the pin 64 and the end of the arms is different in each case. The distance "X" indicated to the end 68 of the arm will be slightly less than or shorter than the minimum tolerable variation between the pressure tap hole and the face of the orifice plate. The distance "Y" to the end of arm 66 will be slightly longer than the maximum tolerable distance between the center of the pressure tap hole and the face of the orifice plate.

According to API and ANSI standards, a tolerance of plus or minus 0.015 (fifteen thousandths) inches is allowed for a three inch or smaller orifice meter while a tolerance of plus or minus 0.030 (thirty thousandths) inches is permitted for four inch or larger orifice meters.

Returning to a consideration of FIG. 1, the utilization of the device may be observed. Initially, the orifice plate 18 will be installed in the meter. The hose or tubing connected to the threaded fitting 34 will be disconnected, if in place. The knob 58 of the shaft will be unthreaded clockwise so that the shaft moves away from the arm. Accordingly, the action of the spring will force the arm toward a position aligned with the shank. The device will then be inserted through the pressure tap hole 30.

Once the device is within the pressure tap hole and inside the meter tube, the knob 58 will be pushed causing the shaft 44 within the bore to move toward and contact the arm. The knob will be rotated (screwed in) until rotation is no longer permitted. At this point, the arm will be perpendicular to the shank and resting against the stop 74 as previously described in FIG. 4.

Finally, the device itself will be rotated by use of the handle 50 if the positioning of the pressure tap hole is proper with respect to the orifice plate, arm 68 should pass the orifice plate without hitting or otherwise striking the orifice plate. Conversely, arm 66, having the longer dimension, should strike against the orifice plate and not pass. The exterior of the shank 40, or other parts of the gauge, might be stamped with the terms "GO" and "NO GO" (or similar wording) to indicate the location an position of the arm in relationship to the orifice plate.

The operator can thereby determine that the pressure tap hole location is proper and meets the minimum and maximum tolerances of all standards.

While the exact distance is not determined by the measurement gauge, it will measure whether the distance is within the tolerances allowable.

It will be observed that this measurement can be taken while the orifice plate is inserted and after the meter has been assembled including the tightening of the gaskets.

It is believed that the present invention also has wider applications where a measurement is desired to be taken within a pipeline or closed container or vessel and access to the interior of the closed container or vessel is not readily available.

Whereas, the present invention has been described in relation to the drawings attached hereto, it should be understood that other and further modifications, apart from those shown or suggested herein, may be made within the spirit and scope of this invention.

What is claimed is:

1. A measurement gauge device for an orifice meter having a meter tube and an orifice plate therein perpendicular to the meter tube, and a pressure tap hole through said meter tube on each side of said orifice plate, each tap hole being parallel with the orifice plate, which measurement gauge device comprises:
    a. a shank receivable through and rotatable in one said pressure tap holes, the shank having a longitudinal axis about which it can be rotated;
    b. arm means movable about an axis perpendicular to the axis of said shank; and
    c. means to move said arm means between a position perpendicular to said shank and a position substantially parallel to said shank, wherein rotation of said shank while said arm is perpendicular will rotate said arm radially within said meter tube.

2. A measurement gauge device as set forth in claim 1 wherein said shank is cylindrical, the axis of said shank being parallel to said orifice plate.

3. A measurement gauge device as set forth in claim 2 wherein said shank has a diameter slightly smaller than the diameter of each said pressure tap hole.

4. A measurement gauge device as set forth in claim 1 wherein said arm means includes a pin for said arm axis and includes a first and second arm extending from opposite sides of said pin.

5. A measurement gauge device as set forth in claim 4 wherein said first arm is slightly shorter than a minimum tolerable distance between each said pressure tap hole and said orifice plate and wherein said second arm is slightly longer than the maximum tolerable distance between each said pressure tap hole and said orifice plate.

6. A measurement gauge device as set forth in claim 1 including spring means to urge said arm means toward a position substantially parallel to said shank.

7. A measurement gauge device as set forth in claim 1 wherein said means to move said arm means includes a shaft passing through an axial bore in said shank, said shaft being movable axially within said bore.

8. A measurement gauge device as set forth in claim 7 wherein said shaft threadably engages with said bore so that rotational movement of said shaft will move said shaft axially within said bore.

9. A measurement gauge device as set forth in claim 8 including a stop to limit the axial movement of said shaft in said bore.

10. A measurement gauge device as set forth in claim 8 including spring means to urge said arm means toward a position parallel to said shank.

11. A measurement gauge device as set forth in claim 1 including handle means extending from said shank to rotate said shank while in one of said pressure tap holes.

12. A method of measuring the minimum and maximum tolerable distance between a restricted orifice plate and a pressure tap hole for an orifice meter in a meter tube, which method comprises:
  a. positioning an arm extending from a shank so that it does not exceed the diameter of said shank;
  b. inserting said shank into said pressure tap hole so that an arm extending from said shank will be within said meter tube;
  c. moving said arm about an axis passing through and perpendicular to said shank so that said arm will be perpendicular to and extend radially from said shank;
  d. rotating said shank from the exterior of said meter tube so that said arm will rotate radially; and
  e. determining whether said arm will touch against said orifice plate to determine compliance with said minimum and maximum tolerable distances between said orifice plate and said pressure tap hole.

* * * * *